(12) United States Patent
Hoffman (10) Patent No.: US 8,986,155 B2
(45) Date of Patent: Mar. 24, 2015

(54) MULTI-SPEED TRANSMISSION

(71) Applicant: Ford Global Technologies, LLC, Dearborn, MI (US)

(72) Inventor: Donald Edward Hoffman, Canton, MI (US)

(73) Assignee: Ford Global Technolgies, LLC, Dearborn, MI (US)

( * ) Notice: Subject to any disclaimer, the term of this patent is extended or adjusted under 35 U.S.C. 154(b) by 0 days.

(21) Appl. No.: 13/940,290

(22) Filed: Jul. 12, 2013

(65) Prior Publication Data

US 2015/0018156 A1    Jan. 15, 2015

(51) Int. Cl.
*F16H 3/62*    (2006.01)
*F16H 3/44*    (2006.01)
*F16H 37/02*    (2006.01)
*F16H 37/06*    (2006.01)

(52) U.S. Cl.
CPC ..................................... *F16H 3/62* (2013.01)
USPC ........... 475/284; 475/302; 475/207; 475/330; 475/275

(58) Field of Classification Search
CPC .................. F16H 2200/201; F16H 2200/2046; F16H 2200/0073
See application file for complete search history.

(56) References Cited

U.S. PATENT DOCUMENTS

| | | | |
|---|---|---|---|
| 5,772,552 A * | 6/1998 | Ibaraki et al. | 475/281 |
| 7,384,361 B2 * | 6/2008 | Tabata et al. | 475/215 |
| 7,993,235 B2 | 8/2011 | Wittkopp | |
| 7,993,237 B2 | 8/2011 | Wittkopp | |
| 8,007,394 B2 | 8/2011 | Phillips | |
| 8,025,602 B2 | 9/2011 | Phillips | |
| 8,033,948 B2 | 10/2011 | Phillips | |
| 8,043,192 B2 | 10/2011 | Phillips | |
| 8,047,954 B2 | 11/2011 | Phillips | |
| 2006/0142112 A1 * | 6/2006 | Kamada et al. | 475/275 |
| 2011/0045936 A1 | 2/2011 | Gumpoltsberger | |
| 2011/0045937 A1 | 2/2011 | Gumpoltsberger | |
| 2011/0045938 A1 | 2/2011 | Gumpoltsberger | |
| 2011/0045939 A1 | 2/2011 | Gumpoltsberger | |
| 2011/0045940 A1 | 2/2011 | Gumpoltsberger | |
| 2011/0045941 A1 | 2/2011 | Gumpoltsberger | |
| 2011/0045942 A1 | 2/2011 | Gumpoltsberger | |
| 2011/0045943 A1 | 2/2011 | Gumpoltsberger | |
| 2012/0053008 A1 | 3/2012 | Beck | |
| 2012/0088626 A1 | 4/2012 | Phillips | |
| 2012/0094799 A1 | 4/2012 | Phillips | |
| 2012/0122627 A1 | 5/2012 | Gumpoltsberger | |
| 2012/0142486 A1 | 6/2012 | Gumpoltsberger | |

OTHER PUBLICATIONS

Benford, Howard L. and Leising, Maurice B., Chrysler Corporation, The Lever Analogy: A New Tool in Transmission Analysis, SAE Paper 810102, Copyright 1982, Society of Automotive Engineers, Inc.

* cited by examiner

*Primary Examiner* — Derek D. Knight
*Assistant Examiner* — Timothy Hannon
(74) *Attorney, Agent, or Firm* — James Dottavio; Brooks Kushman P.C.

(57) ABSTRACT

A family of transmission gearing arrangements provides a plurality of forward speed ratios and one or more reverse speed ratios by selective engagement of shift elements in various combinations. An input and an output are provided. Three planetary gear sets are located at an offset position relative to the input axis and the output axis. Axis transfer gears are provided to transfer rotational energy from the input to one of the planetary gear sets, and from one of the planetary gear sets to the output.

18 Claims, 7 Drawing Sheets

MULTI-SPEED TRANSMISSION

TECHNICAL FIELD

The present disclosure generally relates to automatic transmission for motor vehicles. More specifically, the present disclosure relates to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY

According to one embodiment, a transmission comprises an input configured to rotate about an input axis, and an output configured to rotate about an output axis. A third axis transfer gear is fixed to the input. A fourth axis transfer gear is configured to rotate about the output axis and in continuous meshing engagement with the third axis transfer gear. A second simple planetary gear set includes a second sun gear, a second carrier, and a second ring gear is fixedly coupled to the output. A third simple planetary gear set includes a third sun gear, a third carrier, and a third ring gear fixedly coupled to the fourth axis transfer gear. A second shift element is configured to selectively couple the second sun gear to the third carrier. A third shift element is configured to selectively hold the third sun gear against rotation. A fourth shift element is configured to selectively hold the second carrier against rotation. A sixth shift element is configured to selectively couple the second sun gear to the third sun gear. A first axis transfer gear is fixed to the input, and a second axis transfer gear is configured to rotate about the output axis and in continuous meshing engagement with the first axis transfer gear.

According to one or more embodiment, the transmission further comprises a fifth shift element configured to selectively couple the second carrier to the second axis transfer gear.

According to one or more embodiment, the transmission further comprises a first simple planetary gear set having a first sun gear fixedly coupled to the second sun gear, a first carrier fixedly coupled to the output, a first ring gear, and a first shift element configured to selectively couple the first ring gear to the third carrier.

According to one or more embodiment, the transmission further comprises a first simple planetary gear set having a first sun gear, a first carrier fixedly coupled to the output, a first ring gear fixedly coupled to the second carrier, and a first shift element configured to selectively couple the first sun gear to the third carrier.

According to one or more embodiment, the transmission further comprises a first simple planetary gear set having a first sun gear, a first carrier, and a first ring gear, and a first shift element configured to selectively couple the first carrier to the output.

According to one or more embodiment, the transmission further comprises a first simple planetary gear set having a first sun gear, a first carrier, and a first ring gear fixedly coupled to the third carrier, and a first shift element configured to selectively couple the first sun to the second sun.

According to another embodiment, a transmission comprises an input, an output, and first, second, third, fourth, fifth, sixth, and seventh shafts. A third gearing arrangement is configured to fixedly impose a linear speed relationship among third shaft, the fourth shaft, the output, and the second shaft. A fourth gearing arrangement is configured to fixedly impose a linear speed relationship among fifth shaft, the sixth shaft, and the seventh shaft. A second shift element configured to selectively couple the third shaft to the sixth shaft. A fourth shift element is configured to selectively hold the fourth shaft against rotation. A sixth shift element configured to selectively couple the third shaft to the fifth shaft.

According to yet another embodiment, a transmission comprises an input, an output, and first, third, fourth, fifth, sixth, and seventh shafts. A fourth gearing arrangement is configured to fixedly impose a linear speed relationship among third shaft, the fourth shaft, and the output. A fifth gearing arrangement is configured to fixedly impose a linear speed relationship among fifth shaft, the sixth shaft, and the seventh shaft. A second shift element is configured to selectively couple the third shaft to the sixth shaft. A third shift element is configured to selectively hold the fifth shaft against rotation. A fourth shift element is configured to selectively hold the fourth shaft against rotation. A sixth shift element is configured to selectively couple the third shaft to the fifth shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An element is a transmission input if it is adapted to be fixedly coupled to either a power source or the output of a launch device. A power source may be, for example, an internal combustion engine or an electric motor. A launch device may be, for example, a torque converter or a launch clutch. The input may be coupled to the power source or launch device via a damper designed to absorb torsional vibrations. An element is a transmission output if it is adapted to transmit power to components outside the transmission such as vehicle wheels. There may be a fixed speed ratio other than 1:1 between the output element and the driven component.

Figure 1:
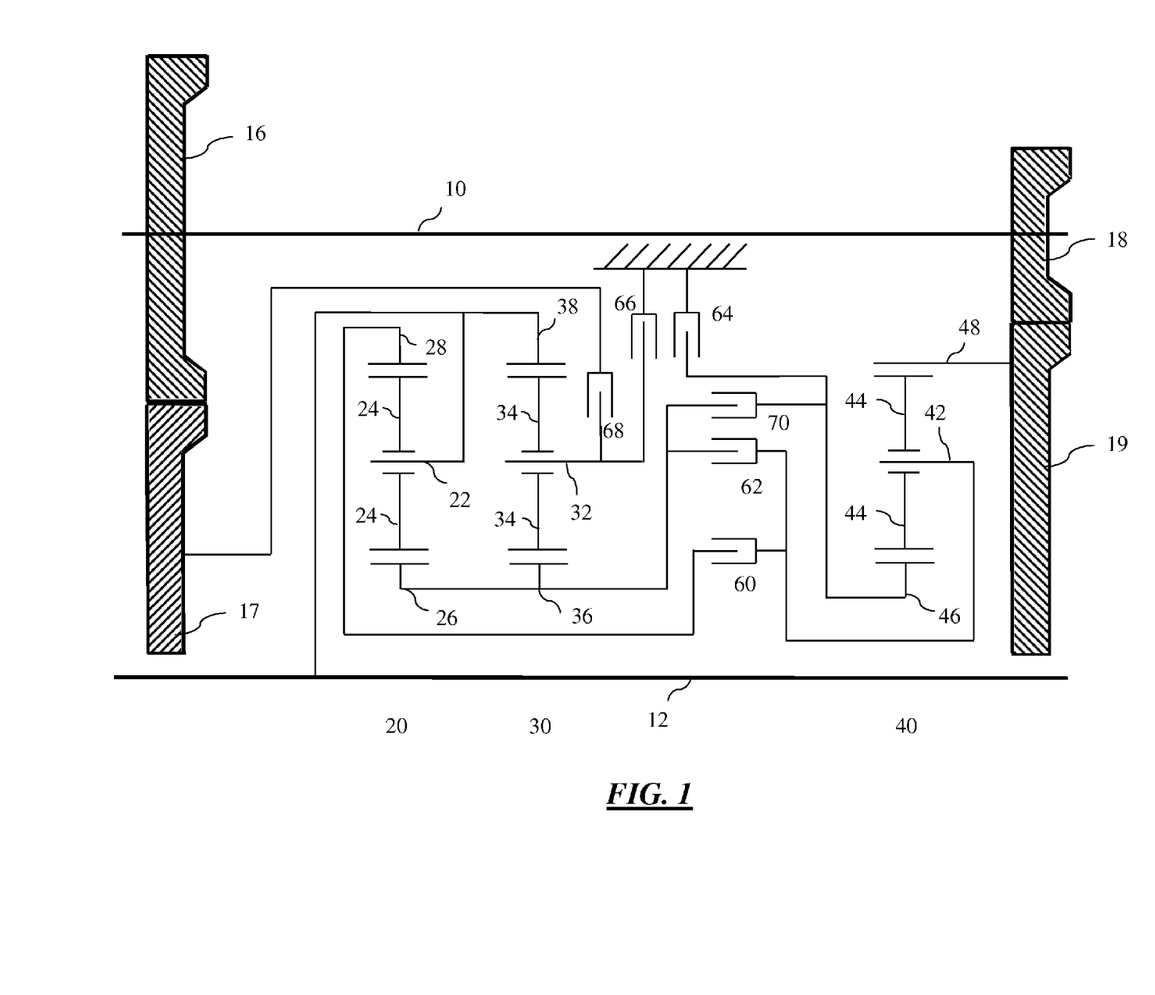
FIG. 1 is a schematic diagram of a first transmission gearing arrangement.

An example transmission is schematically illustrated in FIG. 1. In this transmission, input 10 rotates about an input axis and is driven by the engine, preferably via a launch device such as a torque converter or launch clutch. Output 12 rotates about an output axis and transmits rotational torque out of the transmission and towards a differential, for example. An additional gear or sprocket (not shown) transmits power from the output to the differential which is located on a third axis.

Various lay shafts or axis transfer gears may be provided. For example, a first axis transfer gear 16 is fixed to the input 10 and configured to rotate about the input axis. A second axis transfer gear 17 is configured to rotate about the output axis and is in continuous meshing engagement with the first axis transfer gear 16. The first and second axis transfer gears 16, 17 form a gearing arrangement to transfer the rotation of the input 10 to another axis offset from the input axis. The first and second axis transfer gears 16, 17 may be of different diameters and may each include a different number of gear teeth to transfer rotational energy from the first axis transfer gear 16 to the second axis transfer gear 17 while altering the rotational speed. Alternatively, this function may be provided by other types of gearing arrangements such as a chain and sprockets.

Similar to the first and second axis transfer gears 16, 17, a third axis transfer gear 18 may also be fixed to the input and in continuous messing engagement with a fourth axis transfer gear 19. The third and fourth axis transfer gears 18, 19 also cooperate to transfer rotation of the input 10 to the output axis. The first axis transfer gear 16 and third axis transfer gear 18 may also be of different diameters to enable a range of various rotational speeds being created from multiple sets of axis transfer gears. Additional sets of axis transfer gears may also be provided.

The transmission of FIG. 1 utilizes three simple planetary gear sets 20, 30, and 40. A simple planetary gear set is a type of fixed gearing arrangement, although the term "gearing arrangement" may refer to one or more simple planetary gear sets. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear 26 and ring gear 28 are supported to rotate about the same axis as the carrier 22. Gear sets 30 and 40 are structured similarly to gear set 20, and each includes respective planet carriers 32, 42, planet gears 34, 44, sun gears 36, 46, and ring gears 38, 48.

A simple planetary gear set, such as gear set 20, imposes a fixed speed relationship. The speed of the carrier is constrained to be between the speed of the sun gear and the speed of the ring gear. More specifically, the speed of the carrier is a weighted average of the speed of the sun gear and the speed of the ring gear with weighting factors determined by the number of teeth on each gear. Similar speed relationships are imposed by other types of fixed gearing arrangements that may be implemented in other exemplary embodiments of the present disclosure. For example, a double pinion planetary gear set constrains the speed of the ring gear to be a weighted average between the speed of the sun gear and the speed of the carrier.

The combination of axis transfer gears 16 and 17 may be referred to as a first gearing arrangement. The combination of axis transfer gears 18 and 19 may be referred to as a second gearing arrangement. The planetary gear sets 20, 30 and 40 may be referred to as third, fourth and fifth gearing arrangements, respectively.

A suggested ratio of gear teeth for each planetary gear set and axis transfer gear set is listed in Table 1, below.

TABLE 1

| | |
|---|---|
| Ring 28/Sun 26 | 2.872 |
| Ring 38/Sun 36 | 1.936 |
| Ring 48/Sun 46 | 2.300 |
| Gear 17/Gear 16 | 0.973 |
| Gear 19/Gear 18 | 1.434 |

In the transmission of FIG. 1, sun gear 26 is fixedly coupled to sun gear 36. Carrier 22 is fixedly coupled to ring gear 38 and to the output 12. Ring gear 48 is fixedly coupled to the fourth axis transfer gear 19.

Several shift elements such as clutches and brakes are utilized throughout the transmission to selectively couple various elements of the planetary gear sets and/or selectively hold the various elements against rotation. For example, ring gear 28 is selectively coupled to carrier 42 by clutch 60. Sun gears 26, 36 are selectively coupled to carrier 42 by clutch 62. Sun gear 46 and carrier 32 are selectively held against rotation by brakes 64, 66, respectively. Clutch 68 selectively couples input 10 to carrier 32 through the gearing ratio provided by axis transfer gears 16 and 17; axis transfer gear 16 may be fixed to input 10 while axis transfer gear 17 is selectively coupled to carrier 32 via clutch 68, or alternatively, axis transfer gear 16 is selectively coupled to input 10 via clutch 68 while axis transfer gear 17 is fixed to carrier 32. Sun gears 26, 36 are selectively coupled to sun gear 46 by clutch 70.

One or more rotating elements that are all fixedly coupled to one another may be called a shaft. For example, a first shaft extends between axis transfer gear 17 and clutch 68. A second shaft extends between ring gear 28 and clutch 60. A third shaft extends between sun gears 26, 36 and clutches 62, 70. A fourth shaft extends between carrier 32 and brake 66, clutch 68. A fifth shaft extends between sun gear 46 and brake 64, clutch 70. A sixth shaft extends between carrier 42 and clutches 60, 62. A seventh shaft extends between ring gear 48 and axis transfer gear 19.

Gear sets 20 and 30 collectively impose a fixed linear speed relationship among the third shaft, the fourth shaft, the output shaft, and the second shaft. A similar linear speed relationship among four shafts may be imposed by other types of gearing arrangements. In particular, any two planetary gear sets with two elements of the first gear set fixedly coupled to two elements of the second gear set will impose such a relationship.

As shown in Table 2 below, engaging shift elements in combinations of three establishes eleven forward speed ratios and two reverse speed ratios between input 10 and output 12.

An "X" indicates that the shift element is required to establish the speed ratio. When the gear sets have tooth numbers as indicated in Table 1, the speed ratios have the values indicated in Table 2.

TABLE 2

| | 60 | 62 | 64 | 66 | 68 | 70 | Ratio | Step |
|---|---|---|---|---|---|---|---|---|
| 1$^{st}$ Rev | | X | X | X | | | −3.8380 | 74.2% |
| 2$^{nd}$ Rev | | X | | X | | X | −2.6750 | 51.7% |
| 1$^{st}$ | X | | | X | | X | 5.1716 | |
| 2$^{nd}$ | X | | X | X | | | 4.0086 | 1.2901 |
| 3$^{rd}$ | X | | X | | | X | 2.6724 | 1.5000 |
| 4$^{th}$ | X | X | X | | | | 1.9823 | 1.3481 |
| 5$^{th}$ | X | X | | | | X | 1.3816 | 1.4348 |
| 6$^{th}$ | X | | X | | X | | 1.2378 | 1.1162 |
| 7$^{th}$ | X | | | | X | X | 0.9970 | 1.2415 |
| 8$^{th}$ | X | X | | | X | | 0.9052 | 1.1015 |
| 9$^{th}$ | | X | | | X | X | 0.7683 | 1.1781 |
| 10$^{th}$ | | X | X | | X | | 0.7068 | 1.0870 |
| 11$^{th}$ | | | X | | X | X | 0.5969 | 1.1842 |

While an 11-speed transmission is exemplified in Table 2 along with the description provided above, it should be understood that a 5-speed transmission can be achieved by removing, for example, clutch 70. Other such alterations to the 11-speed transmission are contemplated, and the 11-speed configuration is merely exemplary.

Various other transmissions are illustrated in FIGS. 2-7 and are described below. These transmissions may utilize the suggested ratio of gear teeth for the planetary gear sets as provided in Table 1 above. These transmissions may also utilize the shift schedule provided in Table 2 above to result in a transmission having eleven forward speed ratios and two reverse speed ratios.

Figure 2:
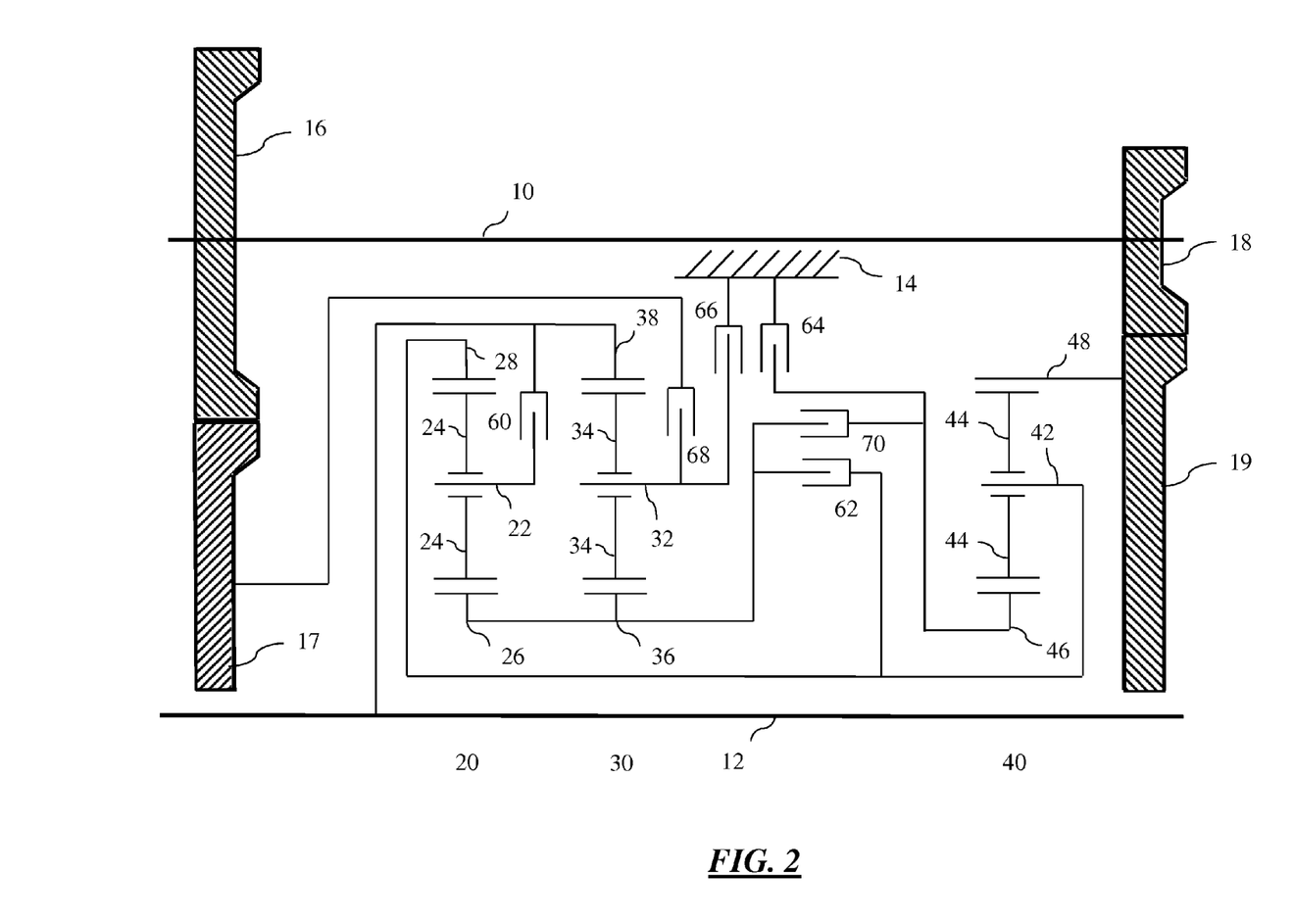
FIG. 2 is a schematic diagram of a second transmission gearing arrangement.

In the transmission of FIG. 2, sun gear 26 is fixedly coupled to sun gear 36. Ring gear 28 is fixedly coupled to carrier 42. Ring gear 38 is fixedly coupled to output 12. Ring gear 48 is fixedly coupled to the fourth axis transfer gear 19.

Carrier 22 is selectively coupled to ring gear 38 and to the output 12 by clutch 60. Sun gears 26, 36 are selectively coupled to carrier 42 by clutch 62. Sun gear 46 and carrier 32 are selectively held against rotation by brakes 64 and 66, respectively. Carrier 32 is selectively coupled to the second axis transfer gear 17 by clutch 68. Sun gears 26, 36 are selectively coupled to sun gear 46 by clutch 70.

Figure 3:
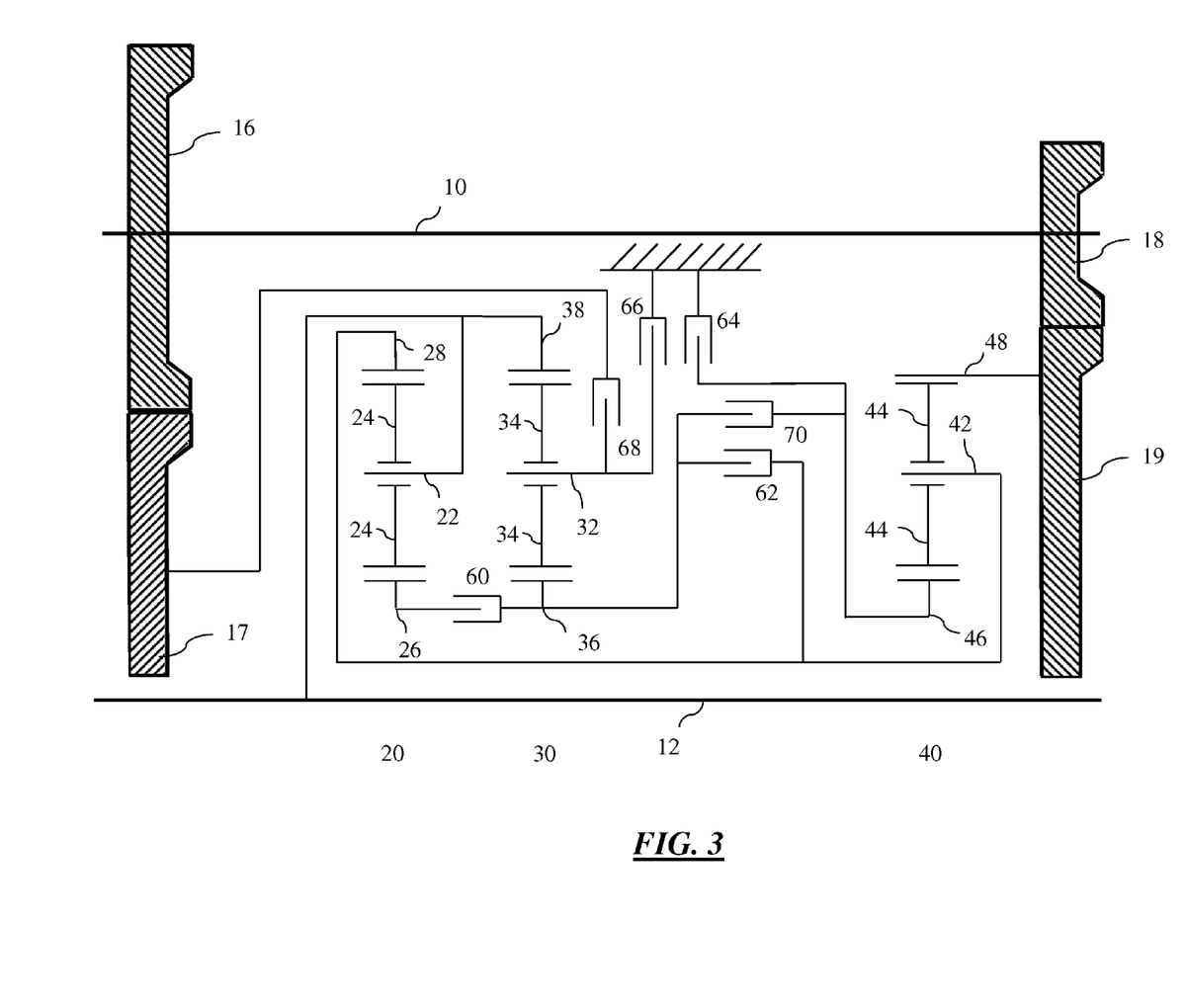
FIG. 3 is a schematic diagram of a third transmission gearing arrangement.

In the transmission of FIG. 3, carrier 22 is fixedly coupled to ring gear 38 and to output 12. Ring gear 28 is fixedly coupled to carrier 42. Ring gear 48 is fixedly coupled to the fourth axis transfer gear 19.

Sun gear 26 is selectively coupled sun gear 36 by clutch 60. Sun gear 36 is selectively coupled to carrier 42 and ring gear 28 by clutch 62. Sun gear 46 is selectively held against rotation by brakes 64. Carrier 32 is selectively held against rotation by brake 66, and is selectively coupled to the second axis transfer gear 17 by clutch 68. Sun gear 36 is selectively coupled to sun gear 46 by clutch 70.

Figure 4:
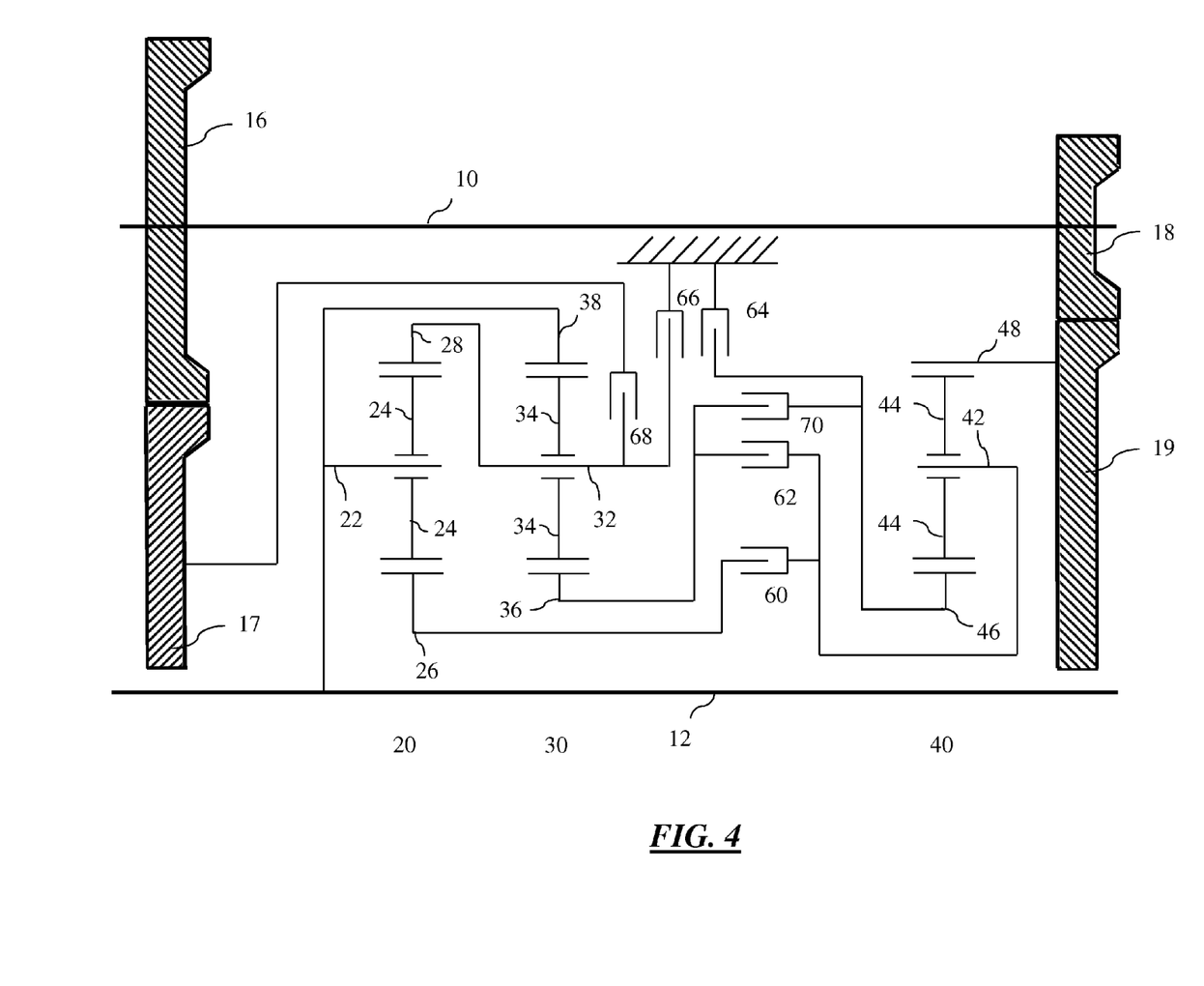
FIG. 4 is a schematic diagram of a fourth transmission gearing arrangement.

In the transmission of FIG. 4, carrier 22 is fixedly coupled to ring gear 38 and to output 12. Ring gear 28 is fixedly coupled to carrier 32. Ring gear 48 is fixedly coupled to the fourth axis transfer gear 19.

Sun gear 26 is selectively coupled to carrier 42 by clutch 60. Sun gear 36 is selectively coupled to carrier 42 by clutch 62. Sun gear 46 is selectively held against rotation by brake 64. Carrier 32 and ring gear 28 are selectively held against rotation by brake 66, and selectively coupled to the second axis transfer gear 17 by clutch 68. Sun gear 36 is selectively coupled to sun gear 46 by clutch 70.

Figure 5:
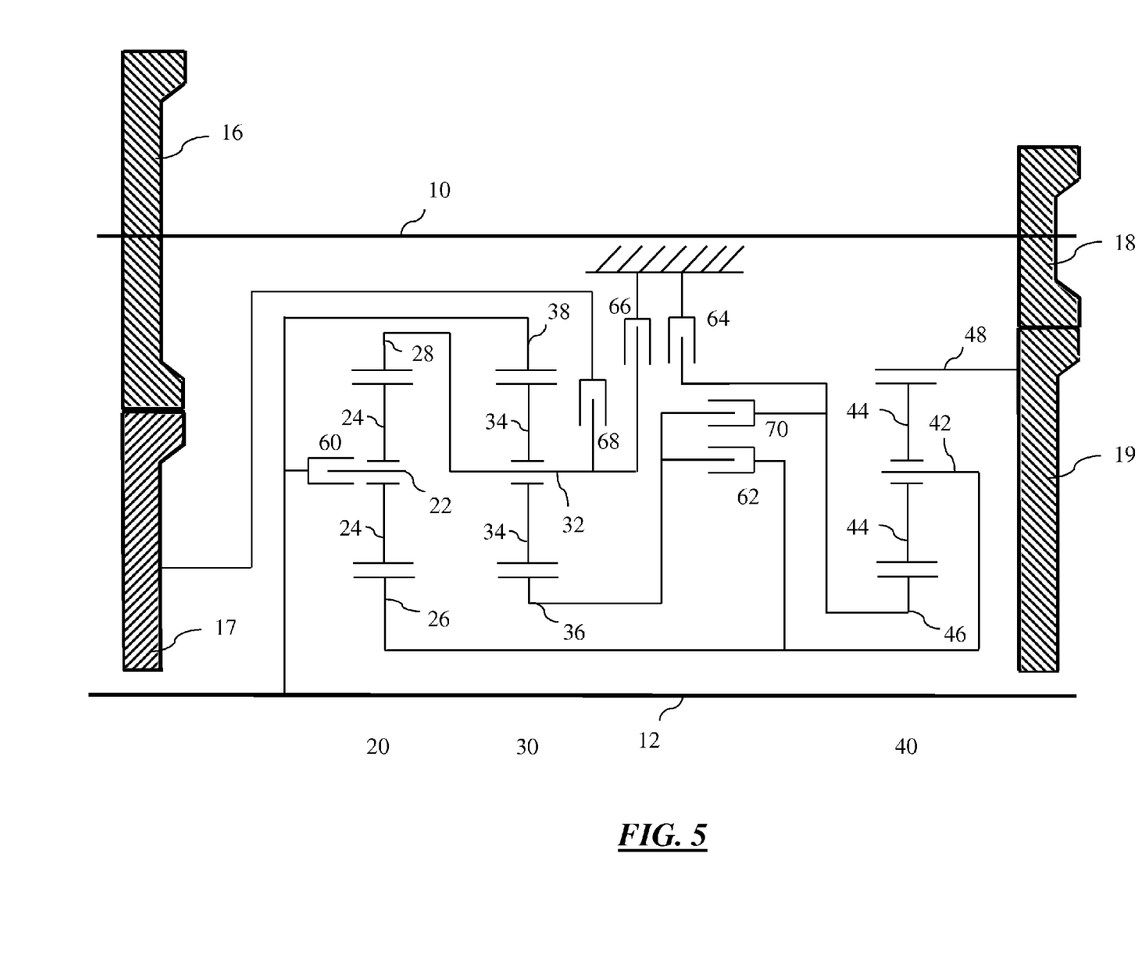
FIG. 5 is a schematic diagram of a fifth transmission gearing arrangement.

In the transmission of FIG. 5, sun gear 26 is fixedly coupled to carrier 42. Ring gear 28 is fixedly coupled to carrier 32. Ring gear 38 is fixedly coupled to output 12. Ring gear 48 is fixedly coupled to the fourth axis transfer gear 19.

Carrier 22 is selectively coupled to output 12 and ring gear 38 by clutch 60. Sun gear 36 is selectively coupled to carrier 42 and sun gear 26 by clutch 62. Sun gear 46 is selectively held against rotation by brake 64. Carrier 32 is selectively held against rotation by brake 66, and is selectively coupled to the second axis transfer gear 17 by clutch 68. Sun gear 36 is selectively coupled to sun gear 46 by clutch 70.

Figure 6:
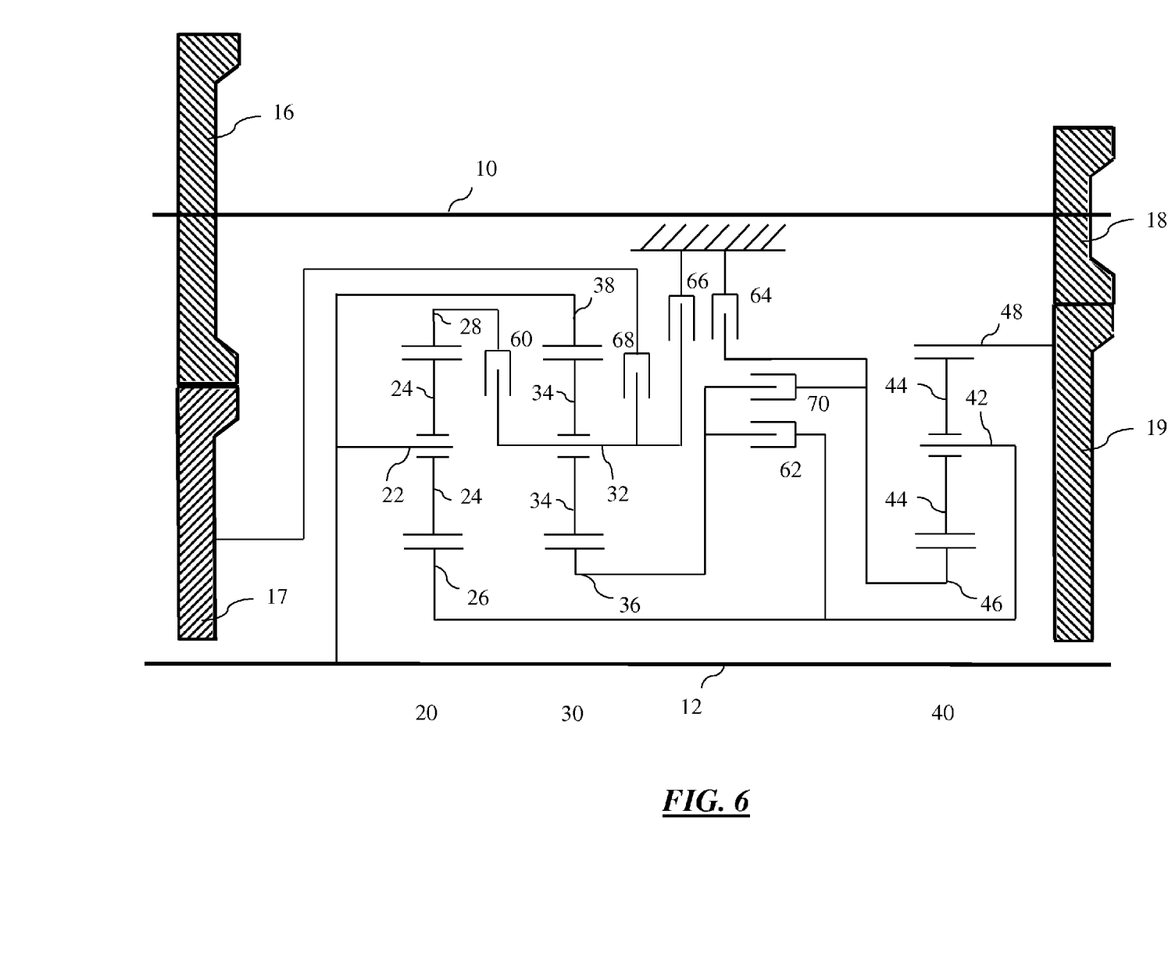
FIG. 6 is a schematic diagram of a sixth transmission gearing arrangement.

In the transmission of FIG. 6, sun gear 26 is fixedly coupled to carrier 42. Carrier 22 is fixedly coupled to ring gear 38 and to output 12. Ring gear 48 is fixedly coupled to the fourth axis transfer gear 19.

Ring gear 28 is selectively coupled to carrier 32 by clutch 60. Sun gear 36 is selectively coupled to sun gear 26 and carrier 42 by clutch 62. Sun gear 46 is selectively held against rotation by brake 64. Carrier 32 is selectively held against rotation by brake 66, and is selectively coupled to the second axis transfer gear 17 by clutch 68. Sun gear 36 is selectively coupled to sun gear 46 by clutch 70.

Figure 7:
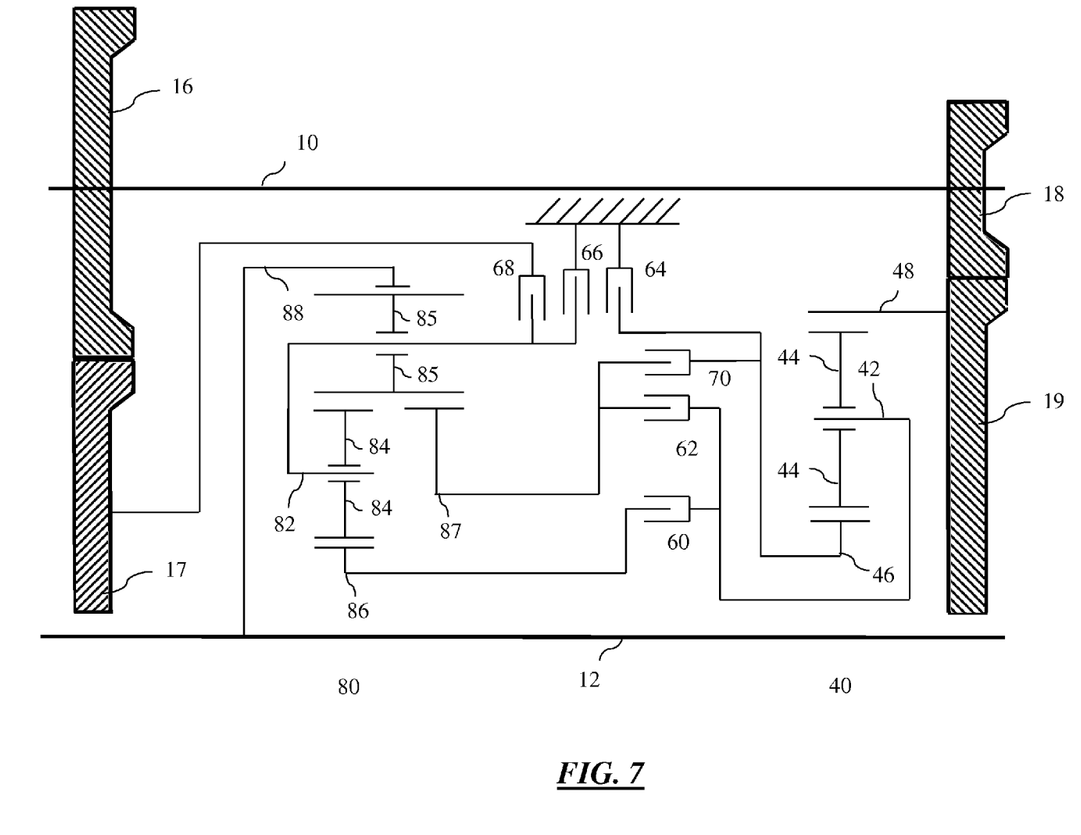
FIG. 7 is a schematic diagram of a seventh transmission gearing arrangement.

In the transmission of FIG. 7, a Ravigneaux gear set 80 is illustrated. The Revigneaux gear set 80 includes two sun gears 86, 87, a single planet carrier 82, and two sets of planetary gears 84, 85 and one ring gear 88 meshing with the outermost of the planetary gears 85. In this example, ring gear 88 is fixedly coupled to the output 12. Ring gear 48 is fixedly coupled to the fourth axis transfer gear 19.

Sun gear 86 is selectively coupled to carrier 42 by clutch 60. Sun gear 87 is selectively coupled to carrier 42 by clutch 62. Sun gear 46 is selectively held against rotation by brake 64. Carrier 82 is selectively held against rotation by brake 66, and is selectively coupled to the second axis transfer gear 17 by clutch 68. Sun gear 87 is selectively coupled to sun gear 46 by clutch 70.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input configured to rotate about an input axis;
   an output configured to rotate about an output axis;
   a third axis transfer gear fixed to the input;
   a fourth axis transfer gear configured to rotate about the output axis and in continuous meshing engagement with the third axis transfer gear;
   a second simple planetary gear set having a second sun gear, a second carrier, and a second ring gear fixedly coupled to the output;
   a third simple planetary gear set having a third sun gear, a third carrier, and a third ring gear fixedly coupled to the fourth axis transfer gear;
   a second shift element configured to selectively couple the second sun gear to the third carrier;
   a third shift element configured to selectively hold the third sun gear against rotation;
   a fourth shift element configured to selectively hold the second carrier against rotation; and
   a sixth shift element configured to selectively couple the second sun gear to the third sun gear.

2. The transmission of claim 1, further comprising:
   a first axis transfer gear fixed to the input; and
   a second axis transfer gear configured to rotate about the output axis and in continuous meshing engagement with the first axis transfer gear.

3. The transmission of claim 2, further comprising:
   a fifth shift element configured to selectively couple the second carrier to the second axis transfer gear.

4. The transmission of claim 1, further comprising:
   a first axis transfer gear selectively coupled to the input by a fifth shift element; and
   a second axis transfer gear configured to rotate about the output axis and in continuous meshing engagement with the first axis transfer gear, wherein the second axis transfer gear is fixedly coupled to the second carrier.

5. The transmission of claim 1, further comprising:
   a first simple planetary gear set having a first sun gear fixedly coupled to the second sun gear, a first carrier fixedly coupled to the output, and a first ring gear; and
   a first shift element configured to selectively couple the first ring gear to the third carrier.

6. The transmission of claim 1, further comprising:
   a first simple planetary gear set having a first sun gear, a first carrier fixedly coupled to the output, and a first ring gear fixedly coupled to the second carrier; and
   a first shift element configured to selectively couple the first sun gear to the third carrier.

7. The transmission of claim 1, further comprising:
   a first simple planetary gear set having a first sun gear, a first carrier, and a first ring gear; and
   a first shift element configured to selectively couple the first carrier to the output.

8. The transmission of claim 1, further comprising:
   a first simple planetary gear set having a first sun gear, a first carrier, and a first ring gear fixedly coupled to the third carrier; and
   a first shift element configured to selectively couple the first sun gear to the second sun gear.

9. A transmission comprising:
   an input;
   an output;
   first, second, third, fourth, fifth, sixth, and seventh shafts;
   a third gearing arrangement which fixedly imposes a linear speed relationship in the order of the third shaft, the fourth shaft, the output, and the second shaft;
   a fourth gearing arrangement which fixedly imposes a linear speed relationship in the order of the fifth shaft, the sixth shaft, and the seventh shaft;
   a second shift element configured to selectively couple the third shaft to the sixth shaft;
   a fourth shift element configured to selectively hold the fourth shaft against rotation;

a sixth shift element configured to selectively couple the third shaft to the fifth shaft;
a first gearing arrangement which fixedly imposes a proportional speed relationship between the input and the first shaft; and
a second gearing arrangement which fixedly imposes a proportional speed relationship between the input and the seventh shaft.

10. The transmission of claim 9, further comprising:
a first shift element which selectively couples the second shaft to the sixth shaft.

11. The transmission of claim 9, further comprising:
a third shift element which selectively holds the fifth shaft against rotation.

12. The transmission of claim 9, further comprising:
a fifth shift element which selectively couples the first shaft to the fourth shaft.

13. A transmission comprising:
an input;
an output;
first, third, fourth, fifth, sixth, and seventh shafts;
a fourth gearing arrangement which fixedly imposes a linear speed relationship in the order of the third shaft, the fourth shaft, and the output;
a fifth gearing arrangement which fixedly imposes a linear speed relationship in the order of the fifth shaft, the sixth shaft, and the seventh shaft;
a second shift element which selectively couples the third shaft to the sixth shaft;
a third shift element which selectively holds the fifth shaft against rotation;
a fourth shift element which selectively holds the fourth shaft against rotation;
a sixth shift element which selectively couples the third shaft to the fifth shaft;
a first gearing arrangement which fixedly imposes a proportional speed relationship between the input and the first shaft; and
a second gearing arrangement which fixedly imposes a proportional speed relationship between the input and the seventh shaft.

14. The transmission of claim 13, further comprising:
a fifth shift element which selectively couples the first shaft to the fourth shaft.

15. The transmission of claim 13, further comprising:
a third gearing arrangement which selectively imposes a linear speed relationship in the order of the third shaft, the output, and the sixth shaft; and
a first shift element which selectively couples the third gearing arrangement to the fifth gearing arrangement.

16. The transmission of claim 13, further comprising:
a third gearing arrangement configured to selectively impose a linear speed relationship among the third shaft, the output, and the sixth shaft; and
a first shift element configured to selectively couple the third gearing arrangement to the output.

17. The transmission of claim 13, further comprising:
a third gearing arrangement which selectively imposes a linear speed relationship in the order of the third shaft, the output, and the sixth shaft; and
a first shift element which selectively couples the third gearing arrangement to the fourth gearing arrangement.

18. The transmission of claim 13, further comprising:
a first gearing arrangement which fixedly imposes a proportional speed relationship between the input and the first shaft; and
a fifth shift element which selectively couples the fourth gearing arrangement to the first gearing arrangement.

\* \* \* \* \*